Aug. 22, 1933.    C. L. RAYMOND    1,923,504
PIPE JOINT
Filed May 21, 1928
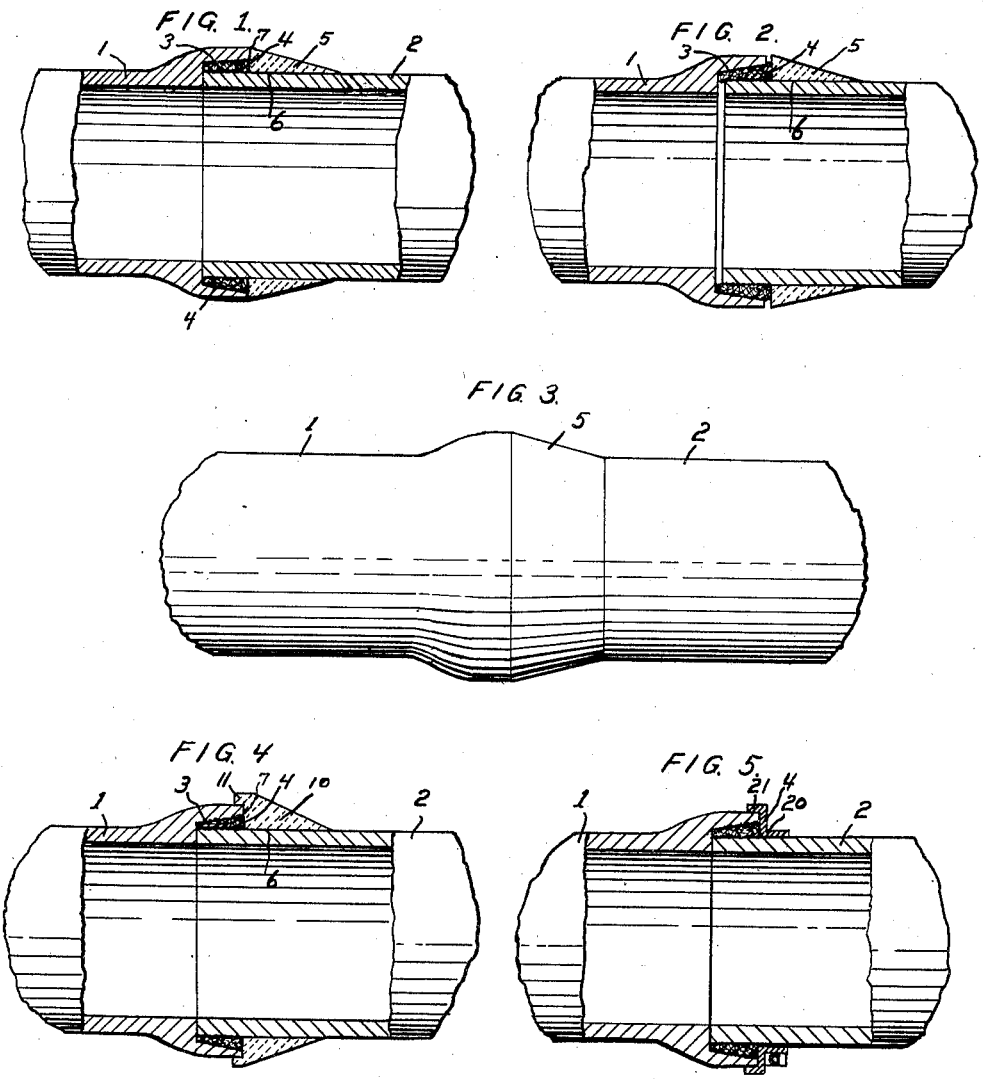
INVENTOR:
Carl Lewis Raymond.
By Eccleston & Eccleston
Attorneys.

Patented Aug. 22, 1933

1,923,504

UNITED STATES PATENT OFFICE 1,923,504

PIPE JOINT

Carl L. Raymond, Sanford, Fla., assignor of one-half to William J. McCracken, Miami, Fla., and one-half to Earl H. Raymond, Washington, D. C.

Application May 21, 1928. Serial No. 279,499

1 Claim. (Cl. 285—115)

The present invention relates to pipe joints and has special reference to such joints when used in connection with concrete or clay pipes in which varying degrees of pressure prevail.

In such pipe constructions it is essential that the joints be sufficiently flexible to withstand stresses caused by the expansion and contraction of the pipe sections, thereby avoiding leaky joints. To provide such flexibility in the joints it has been the common practice to employ asphaltic compositions which are poured in the joint of adjoining pipe sections while hot. Joints of this type are effective in preventing leakage which might otherwise be caused by the expansion and contraction of the pipe sections, but they have an inherent weakness in that they are not sufficiently strong to withstand internal pressures. Extensive experiments as well as actual practice have proven conclusively that constant pressures of fifty or sixty pounds per square inch, and sometimes as low as fifteen to twenty pounds per square inch in pipes provided with such flexible joints will cause the joints to blow-out, thereby resulting in serious leakage of the fluid being transported through the pipe.

Accordingly it is an object of the present invention to provide a pipe joint of the flexible type above mentioned, which is low in cost, permanent and durable in operation, and yet which is sufficiently strong to withstand internal pressures such as are usually encountered in sewer mains, irrigation systems, water supply systems, and the like.

A further object of the invention resides in the provision of a flexible joint in which the sealing compond is protected from the action of ground water, roots, etc., which have a deleterious effect on such compounds.

Other objects and advantages of the invention will be apparent from the following description when taken in connection with the accompanying drawing; in which Figure 1 is a longitudinal section through two sections of pipe in which one embodiment of the improved joint is incorporated.

Figure 2 is a view similar to Figure 1 but showing the joint after the pipe sections have contracted.

Figure 3 is an elevational view of the joint shown in Figure 1.

Figure 4 is a longitudinal section through a modified construction of joint; and Figure 5 is a similar view through a still further modified construction.

Referring to the drawing in greater detail, the numerals 1 and 2 indicate the bell-end and spigot end respectively of two adjoining pipe sections of the conventional bell-end type of pipe. As indicated these pipe sections are made of concrete but it will be understood, of course, that the invention disclosed herein is equally well adapted to pipe sections formed of clay, or similar material.

As is usual in pipe of the present type, the bell-end 1 has an internal diameter sufficiently greater than the spigot end 2 of an adjoining section so as to provide an annular space 3 when these ends are brought into cooperative relationship. In the present construction this annular space is filled with hot asphalt of similar plastic material 4. This material is, preferably, although not necessarily, poured into the annular space 3 as the pipe is being laid and when it cools forms an excellent seal between the adjacent pipe ends.

As previously stated herein such a joint is valuable in that it is sufficiently flexible to adapt itself to expansion and contraction of the pipe sections due to change in temperature, but is objectionable in that it is incapable of withstanding internal pressures such as are usually present in sewer mains, irrigation systems, and the like. This inherent weakness in such joints is due to the fact that the sealing material cannot per se withstand the pressure to which it is subjected and consequently is soon blown out of the joint and permits serious leakage from the system. To reinforce the sealing material 4 so as to prevent its being blown from the joint and at the same time maintain the flexible nature of the joint I provide a collar 5 here shown as of mortar or other cementitious material. Where mortar or the like is employed to form the collar or shoulder 5 the same may be applied by means of a trowel or may be poured in a form if desired. This collar, however applied, abuts the bell-end of the pipe section and thus closes the joint against escape of the sealing ring 4. It should be particularly noted also that the collar 5 extends over a substantial portion of the length of the spigot end of the pipe in contrast to its contact with the bell-end of the adjoining pipe section. These relative areas are indicated by the numerals 6 and 7 and are important in that they provide for a separation of the collar 5 from the bell-end 1 should the pipe sections contract. This operation of the joint is clearly indicated in Figure 2, and is caused by reason of the greater surface contact between the collar and spigot end of the pipe than between the collar and bell-end of the adjoining pipe. By means of this construction the collar 5 always remains intact and furthermore, this comparative weakness of the connection between the collar 5 and bell-end 1 prevents any possibility of rupture of the pipe sections themselves. Should the pipe sections later expand this movement is allowed by reason of the space previously created between the bell-end and the collar 5. Moreover, in this relative movement the flexible joint formed by the sealing compound will at all times function to prevent leakage.

In the modified construction shown in Figure 4, the collar 10 is provided with an overhanging flange 11 which is in engagement with the outer wall of the bell-end, but it should be noted that the area of contact of this flange 11 with the bell-end of the pipe section is substantially less than the area of contact of the collar with the spigot end of the adjacent pipe section, thereby permitting the breaking of the joint of the collar with the bell-end when the pipe sections contract. By the provision of this overhanging flange 11 I provide means for closing the space between the bell-end of the main body of the collar when the pipe sections have contracted, thus avoiding any liability of the sealing medium being forced out through this space, and also affording additional protection of the sealing compound against ground water, roots, etc.

In Figure 5 I have shown a further modified construction which is identical in all respects with that shown in Figure 4, except for the fact that the collar 20 is made of metal. In this form of the invention the collar is provided also with an overhanging lip 21 which serves as an additional precaution against blowing out of the compound 4 should the pipe sections contract so as to open up the joint slightly as heretofore referred to and indicated in Figure 2.

From the foregoing description taken in connection with the accompanying drawing it will be apparent to those skilled in the art, that I have provided a flexible pipe joint for use in sewer mains, irrigation systems, water supply systems, and the like; that the sealing medium employed is reinforced by means of a collar so as to prevent the blowing out of the seal when the pipe sections are partly separated due to contraction thereof caused by temperature changes; that the reinforcing means is so designed as to prevent breakage of any of the parts due to expansion and contraction of the joint or pipe sections; and that deterioration of the sealing compound through contact with ground water, roots, etc., is entirely eliminated.

In accordance with the patent statutes I have described what I now believe to be the best embodiment of the invention but I do not wish to be understood thereby as limiting myself or the scope of the invention, as many changes and modifications may be made without departing from the spirit of the invention; all such I aim to include within the scope of the appended claim.

Having fully described my invention, what I claim as new and desire to secure by Letters Patent is:

A pipe joint for bell-end pipe sections formed of frangible material comprising, two pipe sections arranged with the spigot end of one section positioned within the bell-end of the other section and so proportioned as to provide an annular space between the inner wall of said bell-end and the outer wall of the spigot end of the adjoining section, a plastic sealing compound substantially filling said annular space to provide a flexible joint, and a collar of cementitious material for preventing the blowing out of the sealing compound applied to a substantial area of contact on the spigot end of one pipe section substantially exteriorly of said flexible joint and having a limited area of contact with the bell-end of the adjacent pipe section, whereby any separation of the sections due to contraction thereof will cause a separation between the collar and bell-end of the pipe section.

CARL L. RAYMOND.